United States Patent [19]
Fuhrman

[11] Patent Number: 5,197,084
[45] Date of Patent: Mar. 23, 1993

[54] AUTOMATIC INFORMATION ACQUISITION SYSTEM

[75] Inventor: Thomas A. Fuhrman, Beavercreek, Ohio

[73] Assignee: The United States of America as represented by the Secretary of the Air Force, Washington, D.C.

[21] Appl. No.: 648,247

[22] Filed: Jan. 31, 1991

[51] Int. Cl.$^5$ .......................................... H04L 27/14
[52] U.S. Cl. ................................. 375/88; 455/161.2
[58] Field of Search ................... 375/7, 8, 78, 81, 88, 375/89, 90, 91; 455/161.1, 161.2, 161.3; 358/181

[56] References Cited

U.S. PATENT DOCUMENTS

| | | | |
|---|---|---|---|
| 3,982,188 | 9/1976 | Matsuzawa et al. | 455/161.3 |
| 4,072,905 | 2/1978 | Keelty | 375/81 |
| 4,119,964 | 10/1978 | Johannsen et al. | 343/17.7 |
| 4,387,469 | 6/1983 | Miyazaki et al. | 455/161.3 |
| 4,476,535 | 10/1984 | Loshing et al. | 364/480 |
| 4,551,855 | 11/1985 | Kurosaki et al. | 455/161.1 |
| 4,614,945 | 9/1986 | Brunius et al. | 340/870.03 |
| 4,704,725 | 11/1987 | Harvey et al. | 380/9 |
| 4,723,302 | 2/1988 | Fulmer et al. | 455/161.2 |
| 4,787,063 | 11/1988 | Muguet | 364/900 |
| 4,821,122 | 4/1989 | Teskey | 358/181 |

Primary Examiner—Stephen Chin
Attorney, Agent, or Firm—William G. Auton; Donald J. Singer

[57] ABSTRACT

The automatic information acquisition system includes a process for the control of a tunable radio receiver to automatically receive, decode, and store digitally-coded information which has been transmitted by radio. Key elements of the system include a general-purpose digital computer, a tunable radio receiver, a hardware signal decoder (multi-mode data controller), a hardware interface (Mark/Space detector), and controlling software. The software causes the radio receiver to scan a pre-set range of frequencies in search of suitably formatted signals, as determined by the Mark/Space detector. When a suitable signal is located, the receiver scanning stops, the specific signal coding is identified, and the signal is decoded, with the received information being recorded on computer storage media. If the transmitted frequency shifts, the software will retune the receiver to prevent loss of signal. If the signal is lost due to termination, fading, or interference, the software will abandon it in search of a new signal. This process continues indefinitely.

1 Claim, 2 Drawing Sheets

Microfiche Appendix Included
(36 Microfiche, 36 Pages)

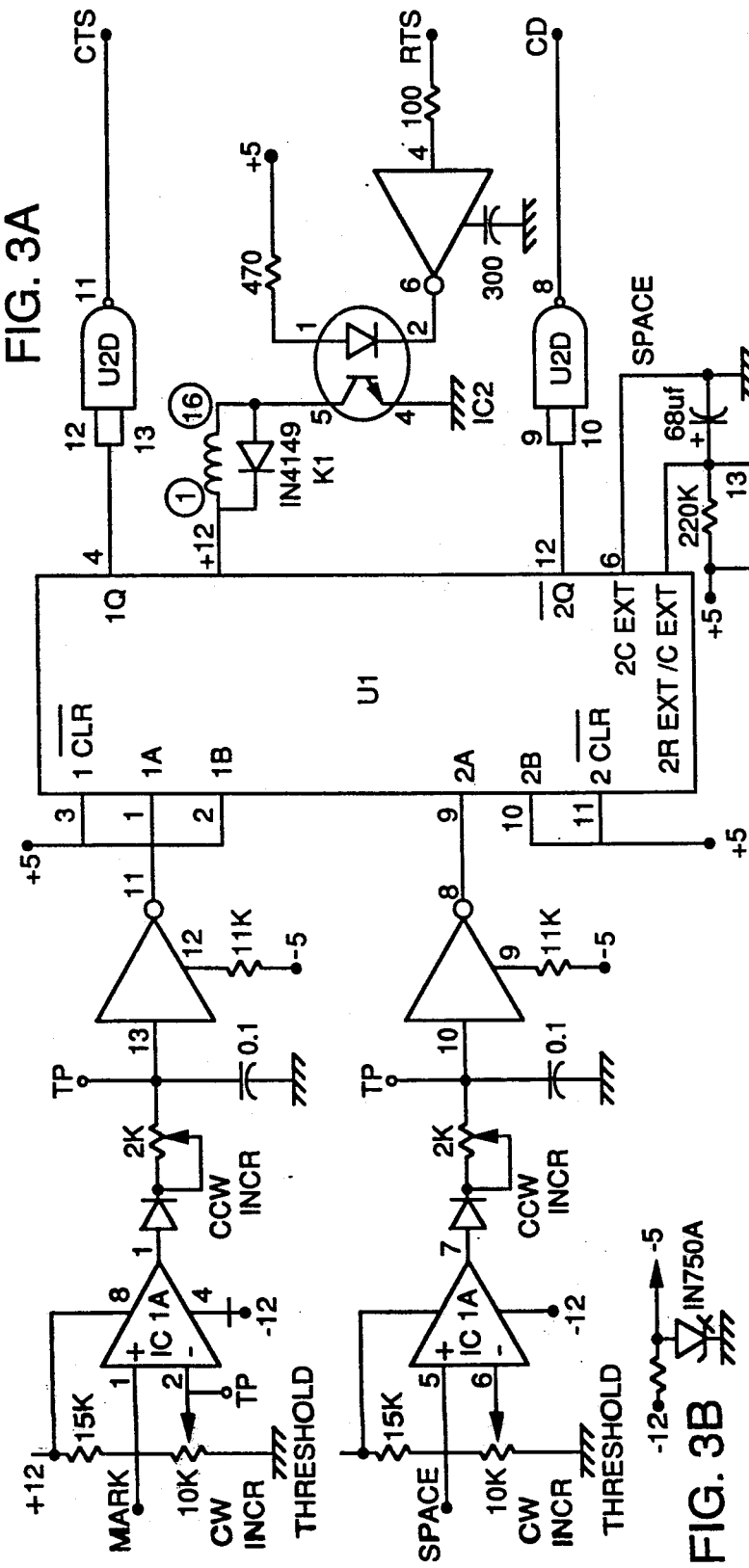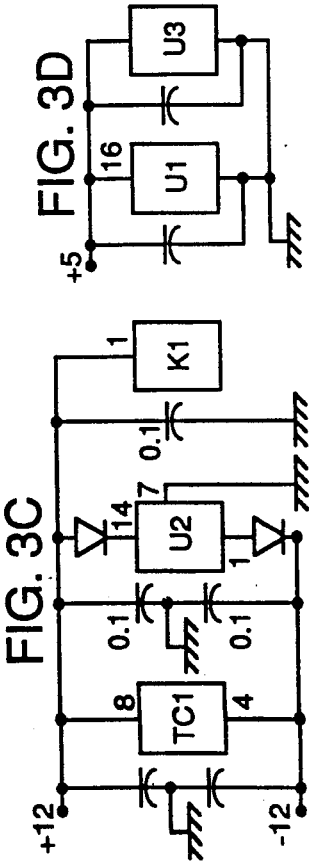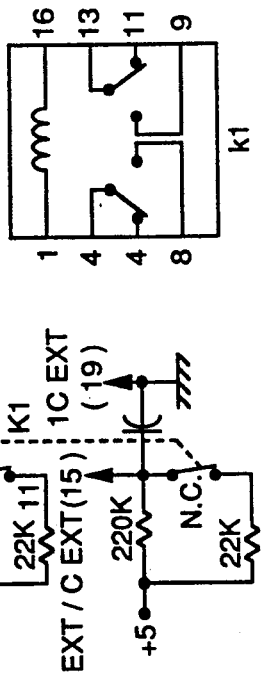

AUTOMATIC INFORMATION ACQUISITION SYSTEM

STATEMENT OF GOVERNMENT INTEREST

The invention described herein may be manufactured and used by or for the Government for governmental purposes without the payment of any royalty thereon.

REFERENCE TO MICROFICHE APPENDIX

Reference is made to the microfiche appendix which contains 36 pages of source code.

BACKGROUND OF THE INVENTION

The present invention relates generally to communication systems, and more specifically the invention pertains to an information acquisition system which controls a tunable radio receiver, with a control algorithm that mimics a human operator, to decode and store digital information received by radio.

Many users of the radio frequency spectrum transmit digitally coded information. Examples of digitally-coded information include Teletype (R), telex, SITOR, AMTOR, packet radio, and telegraphy. The form of modulation employed for all these data transmission modes (except for telegraphy) is binary frequency-shift keying (FSK). FSK is a serial data transmission process in which individual data words are binary-coded as sequences of 1's and 0's. To transmit such a code, the binary 1's are translated to a burst of radio energy at what is called the "mark" frequency, and binary 0's are translated to a burst at a different frequency called the "space" frequency. Bits are sent sequentially. The duration of each burst determines the bit rate: the shorter the burst, the higher the bit rate.

The task of automating the process of scanning a range of radio frequencies in search of Frequency Shift Keying (FSK) signals, and identifying, decoding and storing such signals once they are found is alleviated, to some extent, by the systems disclosed in the following U.S. Patents, the disclosures of which are specifically incorporated herein by reference;

U.S. Pat. No. 4,119,964 issued to Johannsen et al;
U.S. Pat. No. 4,476,535 issued to Loshing et al;
U.S. Pat. No. 4,614,945 issued to Bunius et al;
U.S. Pat. No. 4,704,725 issued to Harvly et al;
U.S. Pat. No. 4,787,063 issued to Muguet; and
U.S. Pat. No. 4,821,122 issued to Teskey.

The above-cited patents include systems which scan a pre-set range of frequencies, and which collect data when a signal is located. Each of these references are discussed below.

The Johannsen et al. reference discloses a radio frequency interference detection system which scans a range of frequencies (3.7–4.2 GHz) stops scanning when locating a signal, and records the angle and amplitude of the signal in a digital format on a computer. While the Johanssen et al. reference is exemplary, the present invention identifies and decodes a message in an information signal (rather than an interference signal) and provides an original controlling software algorithm.

The Loshing et al. reference discloses a system for scanning, monitoring and recording radio frequency signals from different locations. The information is stored in a digital format on a computer memory. The present invention includes an automatically self-adjusting tuneable radio receiver which scans a range of frequencies as controlled by a special computer algorithm. These features are not found in the Loshing et al reference The Brunius et al. reference disclose a radio frequency scanning and recording system with transponders that receive and transmit messages over a predetermined RF transmission bandwidth. However the frequencies are varied in accordance with a predetermined function in time, and the patented system does not have the scanning and lock-on features and the controlling software of the present invention.

The Harvey and Teskey systems scan multi-channel radio and television signals broadcasts at predetermined frequencies. The Muguet reference receives and records radio and television signal broadcasts. These three references do not have the flexibility to scan the variety and range of frequencies in the manner as the tunable radio frequency receiver of the present invention. While the above-cited references are instructive, a need remains to provide an automatic information acquisition system which mimics a human operator by scanning radio frequencies for FSK signals to identify decode and digitally store them. The present invention is intended to satisfy that need.

SUMMARY OF THE INVENTION

The present invention is an automatic information acquisition system which controls a tunable radio receiver to decode and store digital information received by radio using: a computer, a tunable radio receiver, a signal decoder, an interface, and controlling software The computer is programmed with the controlling software to direct the tunable radio receiver to scan a pre-set range of frequencies. When a suitable signal is located, the receiver scanning stops, the specific signal coding is identified, and the signal is decoded, with the received information being recorded on computer storage media. If the transmitted frequency shifts, the software will retune the receiver to prevent loss of signal. If the signal is lost due to termination, fading, or interference, the software will abandon it in search of a new signal. This process continues indefinitely.

One embodiment of the invention uses; a tunable radio receiver, a modem, a computer, a Mark/Space detection circuit, and a frequency control interface unit to locate and store radio frequency signals with FSK serial data. The computer is programmed with a tuning algorithm to direct the radio receiver to incrementally scan a range of radio frequency signals until a particular radio frequency signal with FSK serial data is detected. Once a signal with FSK serial data is detected, the radio receiver is directed to terminate scanning and lock onto the particular radio frequency signal while the data is stored.

The tuning algorithm in the computer is a signal acquisition process composed of two states (the SEEK state and the LOCKON state) and three modes (SETTLE DITHER and LOCKON). The SEEK state begins with a retuning step where the radio receiver incrementally retunes to a radio frequency signal which yields a sufficient first signal tone indicative of a transmitted signal. In the SETTLE mode, the computer evaluates the received signal for the periodic pulsing characteristics which identify FSK signals. If no FSK transmissions are identified, then the signal is abandoned (the ABANDON mode) and the retuning step is initiated again.

If some of the characteristics of FSK signals are detected, the process shifts from the SETTLE mode into the DITHER mode, where minor adjustments are made in the frequency in an attempt to get a strong signal tone. During the DITHER mode, the Mark/Space detector and the computer work together to count the valid mark and space characteristics in the signal, and ascertain the presence of a valid FSK transmission. The DITHER mode lasts twenty seconds and can result in either the LOCKON state being adopted, or the retune step being initiated.

The Mark/Space detection circuit is electrically connected to the modem and the computer, and outputs a detection signal when the electrical stream of signals from the modem contains the periodic pulsing characteristics which identify FSK signals. Frequency Shift Keying (FSK) is a type of radio modulation, used to transmit digitally coded information, which translates a sequence of binary ones and zeroes into a corresponding sequence of transmitted tone bursts, designated by the World Administrative Radio Conference of 1979 (WARC 79) as F1B. These tone bursts have distinctive mark and space periodic pulsing characteristics that are identifiable by the Mark/Space detection circuit, since a binary coded data word when transmitted, consists of a corresponding pattern of mark and space frequencies. The difference between the mark and space frequencies in modern communications systems is typically between 170 and 850 Hertz. The mark and space frequencies themselves are generally in the audio range, and each transmitted bit is called a mark or a space tone.

As described above, it is an object of the present invention to provide a means for scanning radio frequency signals, and identifying a particular radio frequency signal with FSK transmitted data.

It is another object of the invention to provide an automatic information acquisition system which digitally records received FSK transmissions.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIGS. 3A-3E are electrical schematic of the Mark/Space detection circuit used in the present invention.

DETAILED DESCRIPTION OF THE PREFERRED EMBODIMENT

Figure 1:
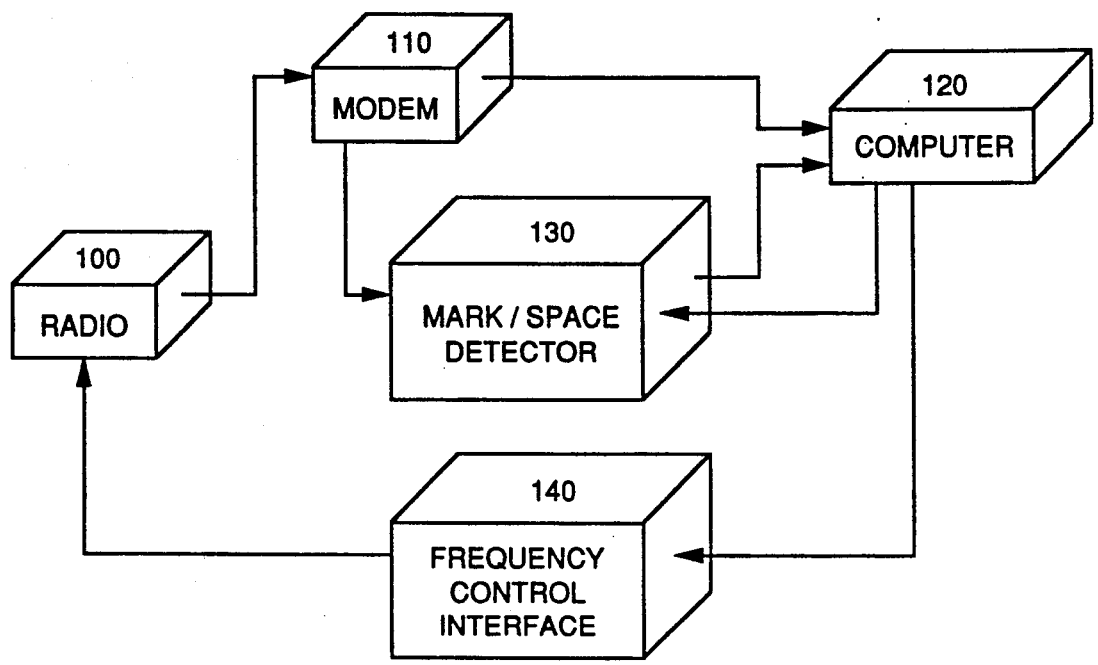
FIG. 1 is a block diagram of the present invention.

The present invention includes an information acquisition system which scans a range of radio frequencies in search of Frequency Shift Keying (FSK) signals, and automates the identification, decoding and storage of signals once found As mentioned above, FSK is a serial data transmission process in which individual data words are binary-coded as sequences of 1's and 0's. To transmit such a code, the binary 1's are translated to a burst of radio energy at what is called the "mark" frequency, and binary 0's are translated to a burst at a different frequency called the "space" frequency. Bits are sent sequentially The duration of each burst determines the bit rate: the shorter the burst, the higher the bit rate.

A binary coded data word, therefore, when transmitted, consists of a corresponding pattern of mark and space frequencies. The difference between the mark and space frequencies in modern communications systems is typically between 170 and 850 Hertz. The mark and space frequencies themselves are generally in the audio range, and each transmitted bit is called a mark or a space tone.

To decode an FSK signal, special filtering is done at the receiving end to convert the received mark and space tones into a sequence of computer-compatible 1's and 0's. This sequence must then be changed into the original data words. The FSK process is essentially the same process employed by the familiar computer-to-telephone modem.

The following parameters must all be specified for a successful FSK link: the definition of the Mark and Space frequencies; the duration of each '1' or '0' bit (i.e., the speed of transmission; the bit sequence used to represent each data word (character); the synchronization protocol (start bits, stop bits, etc.); and any special control codes required.

Existing communications services have adopted many different FSK "standards." To successfully communicate a message, both the sender and the receiver must utilize the same "standard." Although an infinite number of standards are possible, there are several that are used widely.

Examples of communications services which operate regularly using FSK on the shortwave bands include: international wire services; weather services; government and corporate services; amateur radio; and maritime communications services. Much of what is transmitted by these services is textual in nature.

The casual shortwave listener can, with suitable equipment, monitor communications from all these services. The chief obstacles the listener faces are (1) not knowing when and where a particular transmission can be found; and (2) not knowing what "standard" is in use. The persistent listener can scan the shortwave bands and find FSK signals. He can then guess at the standard in use and configure his equipment accordingly. If time allows, he can make repeated guesses about the FSK standard and perhaps succeed in identifying it. Having correctly guessed the FSK parameters, the listener can then gauge his interest in the received signal by reading the resulting text. He might, for example, record what he receives, or he might abandon it in search of something more interesting. The automatic information acquisition system of the present invention automates this process.

The reader's attention is now directed towards FIG. 1, which is a block diagram of a complete automatic information acquisition system which uses the principles of the present invention. The system of FIG. 1 includes: a tuneable radio receiver 100, a modem 110, a Mark/Space detector 130, a computer 120, and a frequency control interface 140. All of these components (except the Mark/Space detector 130) are commercially available, and function as described below.

The radio 100 should be a radio receiver which covers the frequency range of interest, tunable with a minimum frequency resolution of approximately one-fourth of the bandwidth of the received signal. The receiver must have the capability for external control of frequency, and must provide an output signal in a frequency range which is compatible with a modem (usually audio frequency). The radio is controlled by the computer 120 through the frequency control interface 140 so that it sends received radio signals through the modem 110 to the computer 120.

The modem 110 is an electronic device, available commercially, which interfaces between a communications receiver and a computer or other digital electronic device. The modem converts the output signal of the communications receiver to a serial data stream compatible with digital circuitry.

The frequency control interface 140 is a device which interfaces the frequency control circuitry of the communications receiver to the digital computer. The frequency control path from computer to receiver must be capable of repeatable resolution of approximately one-fourth of the bandwidth of the received signal. To insure overall system stability, the time required from issuance of the frequency command until the communications receiver's frequency is actually set to the commanded frequency (i.e., "settling time") must be no greater than the time required to transmit approximately one data word. Some commercial receivers contain an internal frequency control interface.

The Mark/Space detector 130 uses discrete signalling lines to communicate to the computer the presence or absence of valid Mark and Space signals in the modem 110. It uses a dual retriggerable monostable multivibrator, one half for the Mark channel and one half for the Space channel, to signal the host computer through an RS-232 serial port. Each half of the dual monostable multivibrator is held in the appropriate Mark-valid or Space-valid state by virtue of being retriggered by individual bits of the received data word. Retriggering requires a full transition of the input signal; a continuous carrier wave will not cause retriggering. In this way the Mark/Space detector discriminates between signals which have a roughly periodic pulsing characteristic (FSK) and those which do not (most other modulation methods as well as atmospheric noise). When an FSK signal is properly tuned, both the Mark and Space signal lines indicate valid data.

The Mark-Space detector 130 also has a control input from the computer. This input sets the minimum rate at which retriggering must occur in order to keep the output signal line in the valid condition: either 500 milliseconds or 5 seconds (approximately). This capability is used by the software to control the granularity of the "signal valid" data it receives from the Mark/Space detector 130.

The computer 120 is programmed so that it automates the process of scanning a range of radio frequencies in search of Frequency Shift Keying (FSK) signals, and it automates the identification, decoding, and storage of the signals once found. The program which enables the computer to perform this function is a tuning algorithm which is written in UCSD Pascal computer language, and which is given below. In order to understand the tuning algorithm, the reader's attention is now directed towards FIG. 2.

Figure 2:
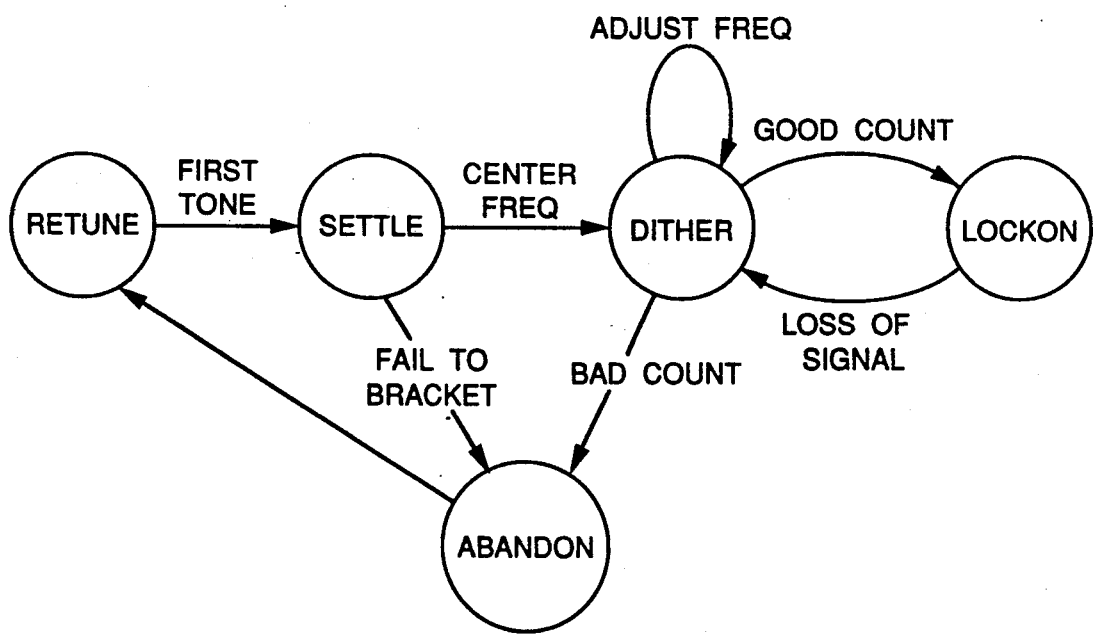
FIG. 2 is an illustration of the process used in the present invention.

FIG. 2 shows the state-transition diagram employed by the tuning algorithm. The only input to this software module is the output of the Mark/Space Detector. In the SEEK state, the Mark/Space Detector is commanded to the 500 ms retrigger interval to allow quick and accurate response while the signal tuning is perfected. If while the system is in the SEEK mode, one of the signal lines indicates the presence of a valid mark or space in the modem, the software attempts to bracket the assumed- FSK signal by entering the SETTLE mode. If the bracketing operation is successful, the DITHER mode is entered. The DITHER mode has a duration of approximately 20 seconds in which ten 2-second intervals are defined. During each interval, the mark-valid and space-valid signal lines are checked once. At the end of the 20-second period, the total counts of mark-valid and space-valid conditions are used to fine tune the frequency, to abandon the signal, or to establish the LOCKON state. In the LOCKON state, the Mark/Space Detector is commanded to the 5-second retrigger interval to provide more tolerance to interference or fading. If either the mark-valid or the space-valid signal is lost while in LOCKON, the system reverts to the DITHER state.

A list of FSK "standards" or protocols is predefined. This list constitutes the collection of possibilities to consider during the "repeated guessing" process described above.

If the multi-mode data controller is set to a protocol other than the one in use by the sender, its output will either be an almost random sequence of characters, or it will have little or no output at all. The analysis software module considers the text stream being received from the multi-mode data controller and, based on the semantic content, decides whether the correct protocol has been set. While a human operator might be able to quickly judge whether the received text is correct or not, the algorithm he or she uses is probably fairly complicated, or at least difficult to quantify. The analysis software module uses the following rules in deciding whether or not valid text is being received: the occurrence of spaces should be approximately 17%; the occurrence of the vowels A, E, I, and O should be approximately 25%; the percentage of numbers and special characters should be small; and characters should be received at a reasonable minimum rate.

A simple mathematical formula is used to calculate a composite "Probability of Valid" parameter (P_VALID). This parameter ranges in value from 0 to 1. If P_VALID is above a certain threshold, the FSK protocol in use is considered to be the correct one, and the signal is said to be identified. If after a reasonable time, P_VALID fails to reach the threshold, another protocol is chosen from the predefined list.

It has been found that the algorithhm used to calculate P_VALID works well; it does a good job of discriminating between valid and invalid text.

After a signal has been identified, the value of P_VALID is an indication of the quality of the communications channel. If the received signal is degraded by interference, fading, noise, or other factors, the certain result will be corruption of the text stream. The value of P_VALID is therefore used to continually assess the quality of the received signal, and control decisions are made based on it.

The reader's attention is now directed towards FIG. 3, which is an electrical schematic of the Mark/Space detector 130 of FIG. 1. As shown in FIG. 1, the Mark/Space detector 130 is electrically connected between the modem 110 and the computer 120.

The Mark/Space detector is believed to be a new concept. With very simple circuitry it effectively distinguishes between valid FSK signals and most other types of radio signals. The key is in setting the retriggering interval to a value based on the bit rate of the signal of interest. Typical FSK signals of today have bit times on the order of 20 milliseconds. Since each data word typically consists of from 5 to 8 bits, alternating between mark and space, it is fair to assume that each type of pulse (mark and space) will occur on the order of every 100 milliseconds at a minimum. This was the basis for the approximately 500 millisecond retriggering interval chosen for the SEEK state. This has proven to be a good choice. Continuous wave signals will not retrigger the monostable, and the signal-valid output will "time out" in about one-half second.

The software-controlled retriggering rate is also believed to be new. This has proven to be very effective in its design role.

The scanning algorithm being so closely linked to the Mark/Space Detector, is believed to be new, and is given in the Microfiche Computer Program Appendix. The Automatic Information Acquisition System works well. What it lacks in the operator skill it makes up for in patience.

The system is based on the concept of high-level (i.e., content-based) decision making. This is believed to be a new feature for this type of system. This has the following advantages: simplicity; problem solution is in the software domain; the invention allows for incorporation of judgmental control algorithms (e.g., use of keywords and meaning in the computation of P_VALID); and the invention is applicable to a wide variety of systems in a hardware-independent fashion.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An information acquisition process of scanning a range of radio frequency signals to identify and store frequency shift key signals which are transmitted on a particular radio frequency signal, said information acquisition process comprising the steps of:

retuning an adjustable radio receiver incrementally within said range of radio frequency signals until a radio signal with a strong signal tone is located;

a first evaluation step in which said radio signal is measured to determine if it has any frequency shift key characteristics;

a first abandoning step in which said radio signal is abandoned and said retuning step is reachieved, said first abandoning step being performed only when said radio signal is determined not to have any frequency shift key characteristics in said first evaluation step;

a dither step in which said radio receiver marginally adjusts its frequency reception in order to maximize the signal tone of the radio signal, said dither step including a second evaluation step in which mark and space signal characteristics are counted in order to determine if there is a frequency shift key signal transmitted within the radio signal;

a lockon step in which said radio receiver is directed to terminate scanning and lock onto the radio signal, said lockon step being performed when said second evaluation step indicates that there is a frequency shift key signal transmitted in said radio signal; and a second abandoning step in which said radio signal is abandoned and said retuning step is reachieved, said second abandoning step being performed only when said radio signal determined not to have frequency shift key characteristics in said second evaluation step.

* * * * *